INVENTORS
ELMER J. CHATTIN
LOUIS F. FRAULA
BY Robert R. Yurich
ATTY.

3,538,682
SERVICE CART FOR HYDRAULIC SYSTEMS
Elmer J. Chattin and Louis F. Fraula, Troy, Ohio, assignors to The B. F. Goodrich Company, New York, N.Y., a corporation of New York
Filed Mar. 28, 1968, Ser. No. 716,880
Int. Cl. B01d 19/00
U.S. Cl. 55—51         3 Claims

ABSTRACT OF THE DISCLOSURE

A vacuum fill service cart and method for bleeding and refilling hydraulic systems featuring a service cart providing for the full vacuum evacuation withdrawing of fluid from the hydraulic system prior to refill and refilling of the hydraulic system while the hydraulic system is vacuum pressurized.

BACKGROUND OF THE INVENTION

This invention relates to an improved hydraulic service cart for bleeding and filling hydraulic systems and more particularly to a service cart for the bleeding and filling of the hydraulic systems of aircraft.

The virtual incompressible character of fluid in a hydraulic system provides instant and accurate power transmission. However, trapped air in the hydraulic system can result in sluggish response and power loss because of each cycle of operation the trapped air must be first compressed before effecting actuation. Consequently, it is of utmost importance that the volume of entrapped air in most hydraulic systems be minimized.

The reliable operation and instant response of the hydraulic systems on aircraft is very essential. Therefore, these systems must be regularly serviced. In servicing, the landing gear hydraulic system must be bled and refilled with fluid to remove any air or gases in the system and to replenish the fluid level. Generally, this bleeding and refilling servicing is performed by bleeding the system fluid through a plurality of bleed-out plugs while adding fresh fluid at an upstream point in the system. This fresh fluid forces the air and older fluid from the system.

The bleeding and refilling of fluid may be performed manually by a serviceman who will open the bleed-out ports and pour fresh fluid into the system through fill ports. This can be an extremely slow process especially where there are numerous portions of the hydraulic system which must be bled and refilled at individual bleed and fill ports to assure satisfactory removal of trapped air.

A more mechanized operation for bleeding and refilling aircraft hydraulic systems involves the provision of a service cart that has several connections which can be connected to several of the bleed-off ports in the system. In this operation, the fluid is pumped into the hydraulic system through service fill ports thereby forcing fluid through the numerous bleed-out points into a fluid reservoir in the service cart. Fluid is continually circulated through the system to absorb or force out any additional air. While this mechanical system of bleeding fluid is faster than manual bleeding and refilling, it has been found that air may still be trapped in pockets or recesses within the hydraulic system. Moreover, this mechanized system requires the bleed-off from several ports and requires that the circulation of fluid continue for a substantial length of time in an effort to absorb or force all the air from all parts of the hydraulic system.

Presently, the airlines require up to three hours to properly bleed and refill the hydraulic systems of modern airliners. It is therefore desirable to provide an improved service system that would more effectively remove air from the system in a substantially shorter period of time.

SUMMARY OF THE INVENTION

The improved hydraulic refilling service cart of this invention reduces the bleeding and refilling time of certain hydraulic systems in aircraft from as long as three hours down to as little as ten minutes. The service cart of this invention further maintains a system that is compact and mobile, enabling it to be readily moved to the site of the aircraft.

This method and service cart of this invention may be adapted to effectively bleed and refill several systems simultaneously. Moreover, the mode of operation of the service cart does not limit its use to any particular hydraulic system and it is possible for this hydraulic refilling service cart to be used for servicing other types of hydraulic systems. The service cart of this invention additionally assures a minimal loss of fluid during the filling of the hydraulic system.

According to this invention, the foregoing features of this invention can be obtained by an improved mobile service cart that initially withdraws fluids from the closed hydraulic system to a predetermined vacuum pressure and then provides for the refilling of the hydraulic system while the system continues under vacuum and evacuation conditions so that the refilling fluid is further deaerated on filling.

DETAILED DESCRIPTION

Figure 1:
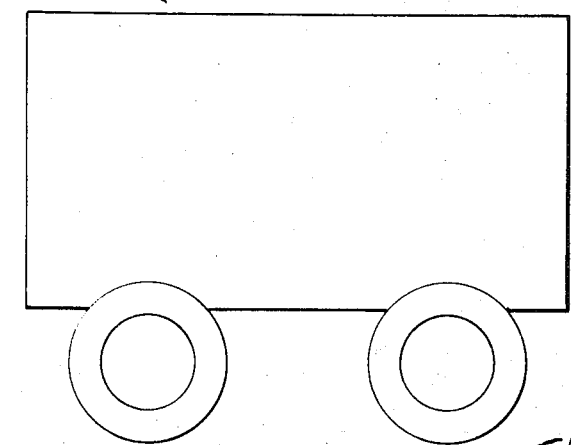
FIGS. 1 and 2 illustrate an end view and side view, respectively, of a mobile service cart representatively illustrating a mobile vehicle incorporating the features of this invention.
Figure 2:
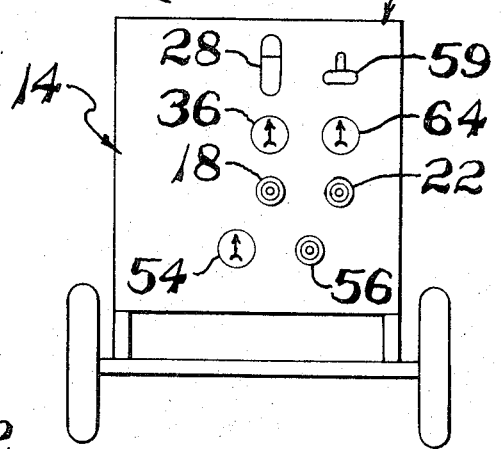

Referring to FIGS. 1 and 2, the service cart 10 illustrates a typical type of vehicle in which this vacuum filling service system may be utilized. This service cart 10 preferably includes two distinct hydraulic refilling cycles 12 and 14. However, only service cycle 12 will be described in detail in this specification since service cycle 14 would include elements similar to those for service cycle 12. Referring to the FIG. 3 schematics, the hydraulic service cycle 12 of service cart 10 includes an evacuation port 16 having an evacuation shut-off valve 18. This evacuation port 16 is adapted for connection by suitable hose means (not shown) to a suitable bleed-out location in the hydraulic system to be serviced. The service cart further includes a system fill port 20 adapted for connection to a suitable fill location in the hydraulic system by a suitable hose means (not shown). This system fill port 20 includes a shut-off fill valve 22.

The evacuation port 16 is in communication with a collection-dispersion tank 24 and a vacuum pump compressor 26. The collection-dispersion tank 24 preferably includes a sight glass 28 which indicates the fluid level of collection tank 24 on the control panel of service cart 10. The tank 24 also includes an electrical float switch 30 that is electrically connected to a solenoid shut-off valve 32 located between the vacuum pump 26 and collection tank 24. The operation of float switch 30 will be hereinafter described.

The vacuum side 34 of vacuum pump 26 preferably includes a vacuum gauge 36 interposed in the piping system between the collection-dispersion tank 24 and the vacuum shut-off valve 32. The positive pressure side 38 of vacuum pump 26 is communicated to a reservoir tank 40. This reservoir tank 40 includes an air chamber side 42 and a fluid chamber side 44 which are separated by a suitable pressure plate.

Preferably, the high pressure side 38 of vacuum pump 26 includes a pressure relief valve 46 to prevent damage to the pump 26. A second solenoid operated air relief valve 48 is provided to prevent pressure build-up inside the air chamber side 42 of reservoir 40.

A check valve 50 is provided between the reservoir tank 40 and the pressure side of vacuum pump 26 to prevent the inadvertent backflow of fluid into the vacuum pump compressor 26.

A manual air pressure valve 52 is provided on the air chamber side 42 of reservoir 40 to permit the addition of air to chamber 42 to increase the pressure in the event of insufficient pressure build-up by pump 26. A pressure gauge 54 and a manual relief valve 56 are also provided on this air side 42 of reservoir 40 to permit the measurement and control of this pressure.

The fluid side of collection-dispersion tank 24 is in communication with an overflow tank 58 having a manual hand pump 59. This overflow tank 58 is adapted for supplying overflow fluid to the hydraulic side 44 of reservoir 40.

The hydraulic side 44 of reservoir 40 is also in communication with system fill port 20. Preferably, a filter 60 including a filter valve 62 are interposed in the piping communicating the hydraulic side 44 of reservoir tank 40 with the system fill port 20. A system fill pressure gauge 64 is also provided to determine the pressure of the filling fluid.

In order to permit complete operation of the service cart from a single location, the control panel for the service cycle 12 on service cart 10 should include the evacuation valve 18 and the system fill valve 22. The vacuum pressure gauge 36 and the system fill pressure gauge 64 are positioned on the control panel to indicate the fluid flow. The sight glass 28 reflecting the fluid level of collection-dispersion tank 24 is also positioned on this control panel. For convenience, the hand lever of the overflow tank 58 is mounted to this control panel. It is also desirable to locate reservoir air pressure gauge 54 on the control panel so that the operator can prevent excess pressure buildup in the system prior to shutdown of the service cycle by the automatic relief valves.

In operation, the service cart 10 is moved to the aircraft site and the evacuation port 16 of service cycle 12 is connected to a suitable bleed-off location in the hydraulic system. The system fill port 20 of the service cycle 12 is connected to a suitable fluid filling location in the hydraulic system. When the connections are made, evacuation valve 18 and fill valve 22 are maintained in their closed position. In the first part of the service operation, the evacuation valve 18 is opened and the vacuum pump 26 started by means of a suitable switch (not shown) on the vacuum cart control panel. During this initial operation, the system fluid and air in the system will be removed from the hydraulic system through evacuation port 16 to the collection-dispersion tank 24 where the air and fluid will be separated. The separated air is removed from collection-dispersion tank 24 by pump 26. The separated fluid is recycled to the hydraulic system through overflow tank 58 and reservoir tank 40. When all the air and fluid have been removed from the hydraulic system, a vacuum pressure is obtained in the hydraulic system which will be recorded on vacuum pressure gauge 36.

When a desired vacuum pressure is obtained in the hydraulic system, the solenoid vacuum shut-off valve 32 is energized and closed. At this point, the integrity of the hydraulic system may be verified by determining if there is any loss of vacuum in the hydraulic system indicated by vacuum pressure gauge 36. If there is no loss of vacuum or only a tolerable loss, the integrity of the system is satisfactory, and there will be no significant fluid loss during the operation of the hydraulic system.

After the integrity of the system is verified, the vacuum shut-off 32 is opened and vacuum pump 26 maintains a vacuum pressure in the hydraulic system.

At this stage, the system fill port valve 22 is opened to allow fluid to flow into the vacuum pressurized hydraulic system, the fluid being positively moved by the pressure on the air chamber side 42 of reservoir 40 and the lower pressure in the hydraulic system. It is possible to confirm this positive flow of fluid by verifying a pressure differential between the reading on the air presusre gauge 54 for the air chamber side 42 of reservoir 40 and the hydraulic fluid pressure as recorded on pressure gauge 64. In the event that this perssure differential becomes too small, it is possible to increase the pressure on the air side 42 of reservoir 40 by manually applying air to the air side 42 by means of manual air valve 52.

Fluid entering the vacuum pressurized hydraulic system is deaerated by this vacuum system. The air separated from the fluid during this vacuum deaeration is removed from the system by pump 26.

As the hydraulic system is filled, an overflow of fluid is pumped through the hydraulic system and communicated through the evacuation port 16 and into the collection-dispersion tank 24. This overflow filling is continued until a desired level of overflow fluid is in the collection-dispersion tank 24 as indicated on the glass sight gauge 28. At this point, the evacuation port valve 18 and fill port valve 22 are closed in that order so that the hydraulic system remains completely filled with fluid with no appreciable amount of air remaining in the system. The vacuum pump 26 may then be shut down and service cart 10 disconnected from the hydraulic system.

The overflow fluid in collection-dispersion tank 24 may be manually pumped from collection-dispersion tank 24 to the hydraulic side 44 of reservoir 40 by means of overflow tank 58.

As previously indicated, the relief valve and the solenoid operated air relief valve 48 operate to relieve any excess pressure on the positive pressure side of vacuum pump 26. It has also been noted that the check valve 50 prevents any inadvertent flow back of hydraulic fluid into vacuum pump 26 in the event of a failure in the system.

If the hydraulic fluid level in collection-dispersion tank 24 reaches a predetermined high level, thereby creating the possibility of fluid flow into the vacuum side of pump 26, the float switch mechanism 30 which is attached to collection-dispersion tank 24 will automatically energize vacuum shut-off valve 32 to prevcent an overflow of fluid into the vacuum side 34 of vacuum pump 26. If this situation occurs, the level of fluid in collection-dispersion tank 24 may be reduced by drawing fluid from the collection-dispersion tank 24 to the manual overflow tank 58.

The fluid filter 60 may be removed and cleaned or replaced by merely closing off the filter valve 62 to permit removal of the filter 60.

Figure 3:
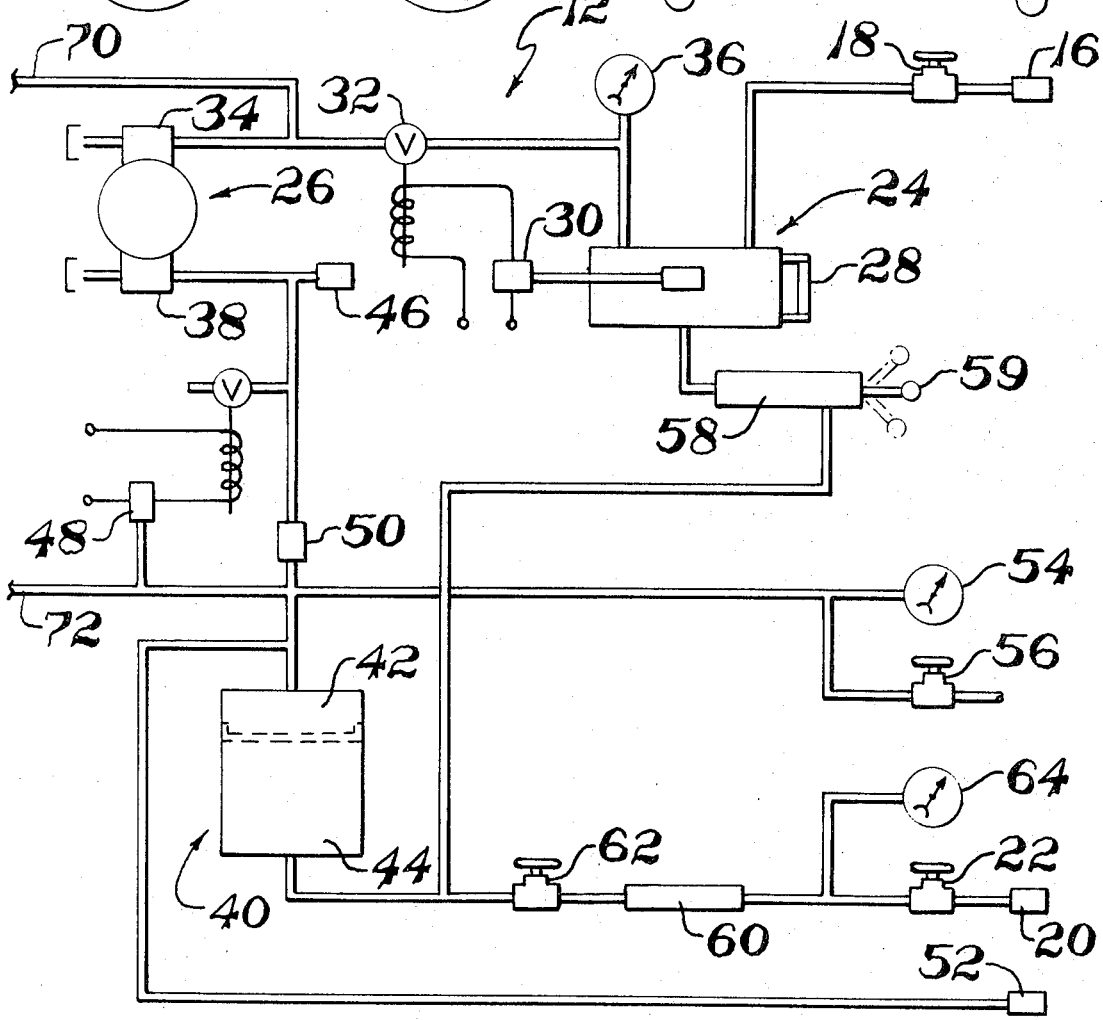
FIG. 3 is the schematic representation for one vacuum filling service cycle of the service cart.

To evacuate one or more of the hydraulic systems, it is merely necessary to connect pump 26 to a tandem refilling cycle 14. Referring to FIG. 3, this may be accomplished by connecting the vacuum side 34 of pump 26 to a second collection-dispersion tank in refilling cycle 14 at outlet 70, and the positive pressure side 38 of vacuum pump 26 to the air side of a second reservoir tank in cycle 14 at outlet 72. Thus the service cart 10 may simultaneously empty and refill two separate systems with a single vacuum pump.

We claim:

1. A vacuum filling service cart for bleeding and filling a hydraulic fluid system comprising:

(1) a service cart frame;

(2) an evacuation port on the service cart frame;

(3) means for connecting said evacuation port to a bleed-out point on the hydraulic system;
(4) a vacuum pump mounted on the service cart frame having its vacuum side adapted for communication with said evacuation port;
(5) a collection-dispersion tank interposed between the vacuum side of said pump and said evacuation port for separating fluid and gases evacuated from the hydraulic system;
(6) means on the service cart for recycling the separated fluid throughout the hydraulic system during evacuation by said vacuum pump including;
(7) a hydraulic reservoir tank with a pressure plate between an air side and a fluid side within said tank;
(8) means for connecting the air side of said hydraulic reservoir tank to the pressure side of said vacuum pump;
(9) means for connecting the fluid side of said reservoir tank to the hydraulic system.

2. A system for the removing of gaseous impurities from a liquid in purifying a hydraulic system comprising the steps of:
(1) withdrawing the hydraulic fluids from a hydraulic system by vacuum means;
(2) vacuum deaerating said hydraulic fluid and system while said fluid is being withdrawn;
(3) filling the hydraulic system with said vacuum deaerated fluid while said withdrawal of the hydraulic fluid is carried on;
(4) and terminating simultaneously the withdrawing and the filling fluid operations in said hydraulic system.

3. A system for the removing of gaseous impurities as set forth in claim 2 wherein the hydraulic system is tested for loss of vacuum in the closed hydraulic system.

References Cited

UNITED STATES PATENTS

| 2,509,816 | 5/1950 | Elson | 73—39 |
| 3,193,988 | 7/1965 | Kudlaty | 55—189 X |
| 3,273,313 | 9/1966 | Livesey et al. | 55—55 X |
| 3,339,401 | 9/1967 | Peters | 73—40.5 |
| 3,357,161 | 12/1967 | Starr et al. | 55—189 |

REUBEN FRIEDMAN, Primary Examiner

RICHARD W. BURKS, Assistant Examiner

U.S. Cl. X.R.

55—55, 189